United States Patent Office 3,197,455
Patented July 27, 1965

3,197,455

DISAZO DYESTUFFS

Jean-Pierre Jung, Riehen, near Basel, and Guido Schetty, Basel, Switzerland, assignors to J. R. Geigy A.-G., Basel, Switzerland No Drawing. Filed Dec. 10, 1962, Ser. No. 243,620
Claims priority, application Switzerland, Dec. 15, 1961, 14,557/61
4 Claims. (Cl. 260—160)

The present invention concerns new disazo dyestuffs, processes for the production thereof, processes for the dyeing of fibres containing natural or synthetic polypeptide as well as, as industrial product, the material fast dyed with the aid of these dyestuffs.

It has been found that valuable dyestuffs are obtained by coupling (a) two mols of a diazotised, negatively substituted amine $D—NH_2$ of the benzene series,
(b) with one mol of a coupling component of the Formula I

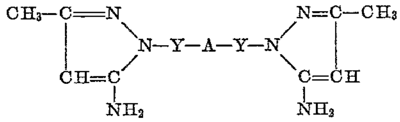

(I)

to form a disazo dyestuff of the general Formula II

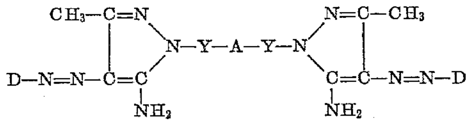

(II)

In the Formulae I and II:

each D is a phenyl radical with from one to two negative substituents as defined below, from zero to maximally four, and preferably two, of which negative substituents in both D's together are water solubilising groups which dissociate acidically in water, each Y is a phenylene radical which is preferably unsubstituted or is further substituted with from one to two of the substituents chloro, bromo, methyl, ethyl, $—SO_3H$ and —COOH, and A is the —CO— or preferably the $—SO_2—$ radical, with the proviso that the total number of water-solubilising groups, including $—SO_3H$ and —COOH is at least 1 and maximally 4.

D in Formula II represents a phenyl radical with from one to two negative substituents and which can contain further substituents compatible with azo dyestuffs. In this specification and in the appended claims negative substituents in D mean the following substituents: trifluoromethyl, cyano and, especially those which contain an oxygen atom and the bond of which between the linking atom and the oxygen is semipolar, namely, the nitro, carboxy, lower alkyl-carbonyl, lower alkoxy carbonyl, as well as, in a preferred group of dyestuffs according to the invention, the sulphonyl-containing group of the formula $$—SO_2R$$

in which R is hydroxyl, phenyl, methylphenyl, chlorophenyl, phenoxy, methylphenoxy, chlorophenoxy, bromophenoxy, chloroacetylaminophenoxy, N-lower alkyl-N-phenyl-amino, phenyl in all the foregoing radicals R containing the same, being either unsubstituted or substituted with $—SO_3H$ or —COOH.

"Lower alkyl" as used in this specification means alkyl with from 1 to 5 carbon atoms.

As additional substituents, the phenyl radical of the diazo components D usable according to the invention can also contain the following substituents compatible with azo dyestuffs: lower alkyl groups such as methyl, ethyl, n- or tert. butyl or tert. amyl; the benzyl, methylbenzyl or chlorobenzyl group; phenyl, lower alkyl phenyl, chloro phenyl, or bromophenyl; lower alkoxy groups such as methoxy, ethoxy, or butoxy; the benzyloxy group; phenoxy, alkylphenoxy with alkyl of maximally 8 carbon atoms, chlorophenoxy, bromophenoxy, phenylthio, alkylphenylthio with alkyl of maximally 8 carbon atoms, chlorophenylthio, or bromophenylthio; acylamino groups such as acetylamino, chloroacetylamino, β-bromopropionylamino, phenacetylamino, phenoxyacetylamino, benzoylamino, chlorobenzoylamino, a triazinylamino or a dichloropyrimidylamino group; lower carbalkoxyamino groups such as the carbomethoxyamino, carboethoxyamino, carbobutoxyamino, carbocyclohexylamino group; finally chlorine, fluorine or bromine.

The term "water solubilizing group which dissociates acidically in water," as used in the specification and the appended claims, means —COOH or $—SO_3H$ or a group of the formula $$—SO_2—NH—SO_2—R'$$

wherein R' is phenyl, methylphenyl, chlorophenyl or bromophenyl (or their sodium, potassium or ammonium salts), and either the aforesaid D or Y contain the said group or groups so that the dyestuffs of Formula II above contain at least one, especially one to four, and preferably two of said water-solubilising, acidically-dissociating groups, preferably a sulphonic acid group.

Particularly suitable diazo components are aminobenzene sulphonic acids, aminophenyl sulphones, aminobenzene sulphonic acid N-alkyl-N-phenyl-amides as well as amino diphenylethers wherein all phenyl radicals can be free from or can contain sulphonic acid groups.

The diazotisation is performed in a known way, for example, in mineral acid, aqueous solution with the alkali metal salts of nitrous acid or in concentrated sulphuric acid with nitrosyl sulphuric acid.

The coupling components of the above formula I usable according to the invention are bis-(pyrazolyl-phenyl)-sulphones which can be coupled in the 4'-position such as, bis[2-, 3- or 4-(3'-methyl-5'-amino-pyrazolyl-(1'))-phenyl]-sulphone, bis-[3-(3'-methyl-5'amino - pyrazolyl-(1'))-4-sulphophenyl] - sulphone, bis-[4-(3'-methyl-5'-amino-pyrazolyl-(1'))-2-chlorophenyl]-sulphone or bis-[3-(3'-methyl-5'-amino - pyrazolyl-(1'))-4-chlorophenyl- or -4-methylphenyl]-sulphone, bis-(pyrazolyl-phenyl)-ketones such as bis-[3- or 4-(3'-methyl-5'-amino-pyrazolyl-(1'))-phenyl]-ketone and bis - [3 - (3'-methyl-5'-amino-pyrazolyl-(1'))-chlorophenyl)-ketone. These coupling components are new and they are obtained, for example, by condensing 2 mols of cyanoacetone or cyanoacetoneimine by known methods preferably in mineral acid, aqueous solution, with a bis-hydrazine of Formula III $$NH_2—NH—Y—A—Y—NH—NH_2 \quad \text{(III)}$$

wherein A and Y have the meanings given in Formulae I and II,

Particularly valuable dyestuffs are obtained on using bis-pyrazolyl compounds of the Formula I previously mentioned wherein A represents the sulphonyl group $—SO_2—$ and the two benzene rings Y are preferably unsubstituted or are further substituted by halogen such as, chlorine or bromine, low alkyl groups such as methyl or ethyl groups and/or sulphonic acid or carboxy groups.

The diazotised amine is coupled at a temperature of about −10° to +50° C. and preferably at +10° to 25° C. with the bis-pyrazolyl compound of Formula I as defined above, advantageously in an aqueous-acid medium, while, if desired, gradually buffering the acid with an agent which raises the pH value, e.g. with an alkali metal salt of a low-molecular fatty acid such as sodium acetate and, if necessary, in the presence of organic solvents which are miscible with water such as low fatty acids, e.g. acetic acid, low fatty alcohols, e.g. methanol or ethanol or low aliphatic ketones such as acetone or also dioxan.

A modification of the process for the production of disazo dyestuffs according to the invention consists in coupling one mol of a diazotised, negatively substituted amine D—$NH_2$ of the benzene series with one mol of a compound of Formula IV

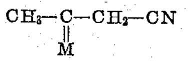

wherein M represents the oxo or the imino group, to form a monoazo dyestuff or Formula V

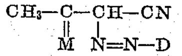 V wherein D has the meaning given in Formula II, and condensing two mols of the monoazo dyestuff so obtained, in an acid aqueous medium, with one mol of a bis-hydrazine of Formula III to form a disazo dyestuff of Formula II.

The diasazo dyestuffs of Formula II produced according to the invention are isolated in the form of their ammonium or alkali metal salts. As such they are yellow, orange to brown powders. They are excellently suitable for the dyeing and printing of natural and synthetic polypeptide fibres such as leather, silk or, principally, wool as well as of synthetic polyamide and polyurethane fibres such as nylon or Perlon. The dyeings obtained on these fibres are usually distinguished by the purity of their greenish-yellow, yellow or orange shades, a good fastness to light and excellent fastness to alkali. They draw onto wool from a neutral to weakly acid bath and the wool dyeings obtained have very good fastness to washing, milling, sea water, chlorine, and rubbing.

Particularly those new disazo dyestuffs of Formula II according to the invention wherein D—$NH_2$ is an o-aminodiphenyl sulphone radical are preferred because of their excellent fastness to light and excellent fastness in the other above-listed wet treatments. Those wherein D—$NH_2$ is a m-aminobenzene sulphonyl- or a m-aminobenzene carbonyl radical are preferred because of their very pure, very greenish-yellow shade, and are therefore very valuable as combination dyestuffs, since they can be combined well with pure blue dyestuffs to give brilliant green shades.

Further details can be seen from the following examples. Where not otherwise expressly stated, parts are given as parts by weight. The temperatures are in degrees centigrade. The relationship of parts by weight to parts by volume is as that of grammes to cubic centimeters.

EXAMPLE 1

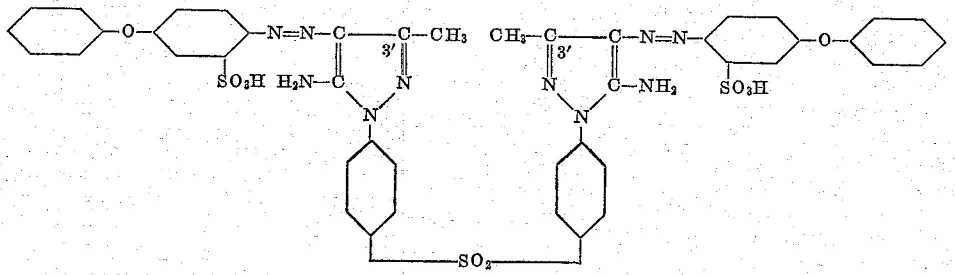

A solution of the sodium salt of 26.5 parts of 4-aminodiphenyl-ether-3-sulphonic acid and 6.9 parts of sodium nitrite in 500 parts of water is added at 0–5° to 30 parts of concentrated hydrochloric acid and the amount of ice necessary for cooling. On completion of the diazotisation, the colourless diazo suspension is poured at 0–10° slowly into the solution of 20.4 parts of bis-[4-(3′-methyl-5′-amino-pyrazolyl-(1′))-phenyl]-sulphone in 500 parts of ethanol while stirring. Coupling occurs immediately and the solution turns yellow. The mineral acid is buffered by the dropwise addition of sodium acetate solution until the reaction solution no longer turns congo paper blue. The reaction mixture is then stirred for several hours at 20–30° until no more diazonium compound can be traced. The disazo dyestuff is precipitated with the aid of 1000 parts of water and 150 parts of sodium chloride, filtered off under suction, washed with 5% sodium chloride solution and dried.

The yellow dyestuff which dissolves well in hot water dyes wool from a neutral to weakly acid bath in the presence of ammonium sulphate in pure, greenish-yellow, very level shades which are fast to wet and light.

The bis-[4-(3′-methyl-5′-amino-pyrazolyl-(1′)) - phenyl]-sulphone of M.P. 237° used as coupling component is obtained by reacting 1 mol of 4,4′-bis-hydrazino-1,1′-diphenyl sulphone with 2 mols of cyanoacetone imine in a hydrochloric acid, aqueous medium.

EXAMPLE 2

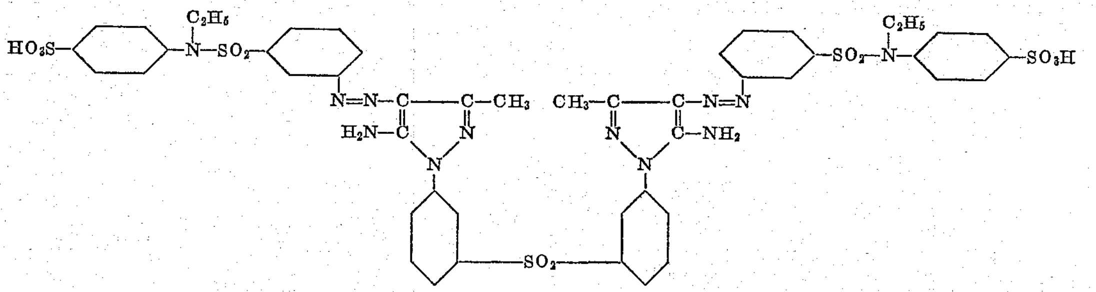

35.6 parts of 3-aminobenzene-1-sulphonic acid N-ethyl-N-4′-sulphophenylamide are dissolved in 800 parts of water with the addition of sodium hydroxide. 6.9 parts of sodium nitrite are added and then 30 parts of concentrated hydrochloric acid are added at 0–5° and the mixture is stirred for 1 hour at 0–10°. After decomposition of the excess nitrous acid, 20.4 parts of bis-[3-(3′-methyl-5′-amino-pyrazolyl - (1′)) - phenyl]-sulphone are added. The coupling occurs immediately and the suspension turns yellow. The mineral acid is buffered by the dropwise addition of sodium acetate solution until the reaction suspension no longer turns congo paper blue and then the mixture is stirred for several hours at 10–20° until no more diazonium compound can be traced. The disazo dyestuff which has partly precipitated is completely precipitated with the aid of sodium chloride. It is in the form of the sodium salt and is filtered off, if necessary dissolved and allowed to crystallise from water, and dried.

The dyestuff is a yellow powder which dissolves in hot water with a greenish yellow colour. It dyes wool, silk and synthetic polyamide fibres from a neutral to weakly acid bath in pure, very greenish-yellow shades having very good fastness properties.

The bis[3-(3'-methyl-5'-amino-pyrazolyl-(1')) - phenyl]-sulphone of M.P. 224° used as coupling component is obtained by reacting 1 mol of 3,3'-bis-hydrazino-1,1'-diphenyl sulphone with 2 mols of cyanoacetone imine in a hydrochloric acid, aqueous medium.

EXAMPLE 3

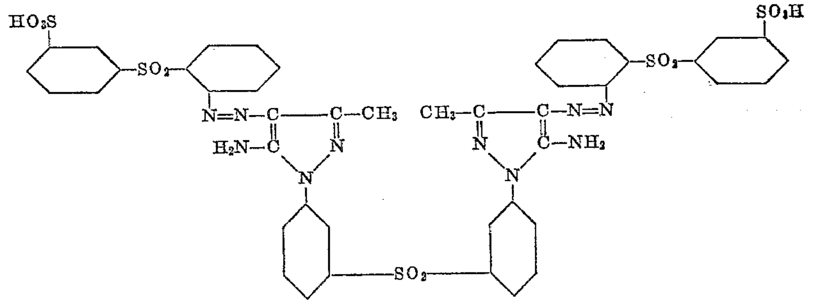

31.3 parts of the sodium salt of 2-amino-1,1'-diphenyl sulphone-3'-sulphonic acid are dissolved in 500 parts of water, 6.9 parts of sodium nitrite are added and the solution is added dropwise while stirring at 0–5° to 30 parts of concentrated hydrochloric acid and 100 parts of ice. After stirring for 1 hour at 0–5°, the excess nitrous acid is decomposed and the colourless diazo suspension is poured into a solution of 20.4 parts of bis-[3-(3'-methyl-5'-amino-pyrazolyl-(1'))-phenyl]-sulphone in 500 parts of ethanol. Coupling occurs immediately and the colour turns yellow. After adding 50 parts of crystallised sodium acetate, the coupling mixture is stirred for 6 hours at 0–10°, then diluted with 1000 parts of water, 200 parts of sodium chloride are added and the precipitated yellow disazo dyestuff is filtered off under suction. It is washed with a 10% aqueous solution of sodium chloride and dried in vacuo at 80–85°.

The dyestuff is a yellow powder which dissolves in hot water with a greenish-yellow colour. It dyes wool and synthetic polypeptide fibres from a bath containing ammonium sulphate at the boil in level, pure greenish-yellow shades which are very fast to light, alkali and wet.

EXAMPLE 4

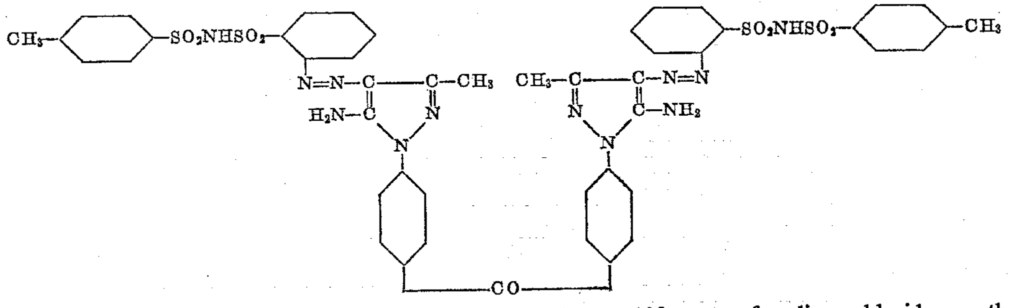

32.6 parts of 2-amino-4'-methyl-1,1'-diphenyl disulphimide are diazotised in the same way as the diazo component of Example 3. The colourless diazo suspension is then poured into the solution of 18.6 parts of bis-[4-(3'-methyl-5'-amino-pyrazolyl-(1'))-phenyl]-ketone and 15 parts of concentrated hydrochloric acid in 500 parts of ethanol. Coupling occurs immediately and the colour turns yellow. The mineral acid is buffered by the dropwise addition of sodium acetate solution until the reaction solution no longer turns congo paper blue and the whole is stirred for several hours at 20–25° until no more diazonium compound can be traced. The partly precipitated disazo dyestuff is completely precipitated with the aid of sodium chloride, filtered off, if necessary dissolved in water and recrystallised and dried in vacuo at 80–85°.

The dyestuff is a yellow powder which dissolves in hot water with a greenish-yellow colour. It dyes wool at the boil from a bath containing ammonium sulphate in level pure greenish-yellow shades which are fast to wet and light.

The bis-[4-(3'-methyl-5'-amino-pyrazolyl-(1')) - phenyl]-ketone of M.P. 227° used as coupling component is obtained by reacting 1 mol of 4,4'-bis-hydrazino-1,1'-diphenyl ketone with 2 mols of cyanoacetone imine in a hydrochloric acid aqueous solution.

EXAMPLE 5

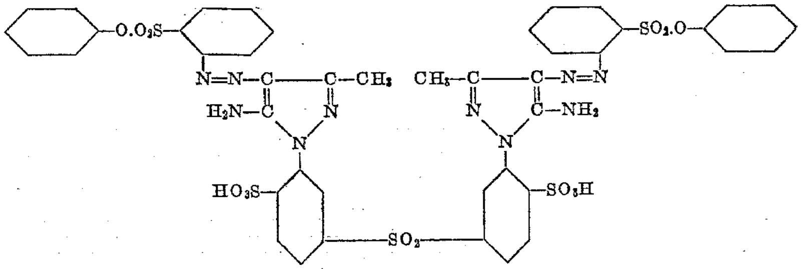

24.9 parts of 2-aminobenzene-1-sulphonic acid phenyl ester are suspended in 180 parts of glacial acetic acid, dissolved by the dropwise addition of 30 parts of concentrated hydrochloric acid and diazotised at 0–10° by the addition of 6.9 parts of sodium nitrite in 20 parts of water. The diazo solution is slowly poured at 0–5° into the solution of the sodium salt of 28.4 parts of bis-[3-(3'-methyl-5'-amino-pyrazolyl-(1'))-4-sulphophenyl]-sulphone and 25 parts of crystallised sodium acetate in 600 parts of water. The mixture is stirred for several hours at 0–10°, 100 parts of sodium chloride are then added, the precipitated dyestuff is filtered off and dried.

It is a yellow powder which dissolves in hot water with a greenish-yellow colour. It dyes wool at the boil from a neutral to weakly acid bath containing ammonium sulphate in pure greenish-yellow, very level shades which are fast to wet and light. The bath is well exhausted.

The bis-[3-(3′-methyl - 5′ - amino-pyrazolyl-(1′))-4-sulpho-phenyl]-sulphone used as coupling component is obtained by reacting 1 mol of 3,3′-bis-hydrazino-1,1′-diphenyl sulphone-4,4′-disulphonic acid with 2 mols of cyanoacetone imine in a hydrochloric acid aqueous solution.

EXAMPLE 6

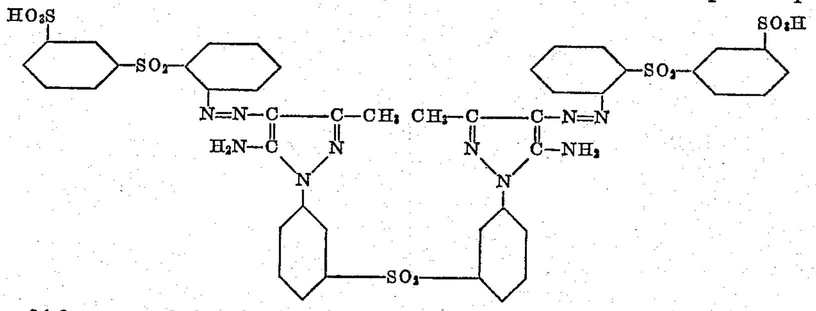

31.3 parts of 2-amino-1,1′-diphenyl sulphone-3′-sulphonic acid are diazotised as described in Example 3 and coupled at 0–5° with the solution of 8.2 parts of cyanoacetone imine and 15 parts of concentrated hydrochloric acid in 400 parts of water. After the addition of 50 parts of crystallised sodium acetate, the mixture is stirred for 4 hours at 5–10° whereupon the formation of the monoazo dyestuff is complete. A freshly prepared hydrochloric acid solution of 13.5 parts of 3,3′-bis-hydrazino-1,1′-diphenyl sulphone (produced, e.g. by reducing tetrazotised 3,3′-diamino-1,1′-diphenyl sulphone with sodium sulphite) and 500 parts of ethanol is then added to the pale yellowish coloured dyestuff solution and the whole is boiled for 1 hour. Condensation to the disazo dyestuff of the above formula occurs while the colour gradually becomes more strongly yellow. The dyestuff solution is then cooled to 20° whereupon the dyestuff already partly precipitates. It is precipitated by the addition of 200 parts of sodium chloride, filtered off, washed with 10% aqueous sodium chloride solution and dried.

The dyestuff is identical with that according to Example 3.

EXAMPLE 7

100 parts of previously well wetted wool are entered at 50° into a bath containing 1.5 parts of the greenish-yellow dyestuff according to Example 3, 5 parts of ammonium sulphate and 5 parts of sodium sulphate in 3000 parts of water. The bath is brought to the boil within 10 minutes and kept at the boil for 45 minutes. In this time the dyestuff has substantially completely drawn onto the wool. The wool dyeing obtained is extraordinarily pure greenish-yellow, very level and has excellent fastness to wet and light.

Further dyestuffs according to the invention are given in the following Table I which are produced by using corresponding amounts of diazo and coupling components according to the methods described in Examples 1 to 6.

*Table I*

| No. | Diazo component | Coupling component | Shade of wool dyeing |
|---|---|---|---|
| 1 | 4-aminodiphenylether-3-sulphonic acid | bis-[3-(3′-methyl-5′-aminopyrazolyl-(1′))-phenyl]-sulphone | Greenish yellow. |
| 2 | 2-aminobenzene-1-sulphonic acid-N-ethyl-N-(4′-sulphophenyl)-amide. | do | Yellow. |
| 3 | 3-aminobenzene-1-sulphonic acid-(4′-chloro-3′-methyl-6′-sulphophenyl)-ester. | do | Greenish yellow. |
| 4 | 2-amino-4′-methyl-1,1′-diphenyl-disulphimide | do | Do. |
| 5 | 4-amino-4′-chloro-1,1′-diphenyl-disulphimide | do | Do. |
| 6 | 2-aminobenzene-1-sulphonic acid | do | Do. |
| 7 | 2-amino-4′-methyl-1,1′-diphenyl-disulphimide | bis-[2-(3′-methyl-5′aminopyrazolyl-(1′))-phenyl]-sulphone | Do. |
| 8 | 3-aminobenzene-1-sulphonic acid-(4′-methyl-3′-sulphophenyl)-ester. | do | Do. |
| 9 | 2-amino-1,1′-diphenylsulphone-3′-sulphonic acid | do | Yellow. |
| 10 | 2-aminobenzene-1-sulphonic acid-N-ethyl-N-(4′-sulphophenyl)-amide. | do | Do. |
| 11 | 4-aminobenzene-1-sulphonic acid-N-ethyl-N-(4′-sulphophenyl)-amide. | do | Do. |
| 12 | 2-amino-1,1′-diphenyl sulphone | bis-[3-(3′-methyl-5′-aminopyrazolyl-(1′))-4-sulphophenyl]-sulphone. | Do. |
| 13 | 2-aminobenzene-1-sulphonic acid-(4′-chloroacetylaminophenyl)-ester. | do | Do. |
| 14 | 3-amino-6-methylbenzene-1-sulphonic acid-N-ethyl-N-phenylamide. | do | Greenish yellow. |
| 15 | 2-aminobenzene-1-sulphonic acid-(2′-methylphenyl)-ester | do | Yellow. |
| 16 | 2-amino-5-chloroacetylaminobenzene-1-sulphonic acid (2′-methylphenyl)-ester. | do | Do. |
| 17 | 3-aminobenzene-1-sulphonic acid-N-methyl-N-phenylamide. | do | Greenish yellow. |
| 18 | 4-amino-4′-methyl-1,1′-diphenyl-disulphimide | bis-[3-(3′-methyl-5′-aminopyrazolyl-(1′))-4-chlorophenyl]-sulphone. | Yellow. |
| 19 | 2-aminobenzene sulphonic acid | do | Greenish yellow. |
| 20 | 3-amino-4′-methyl-1,1′-diphenylsulphone-3′-sulphonic acid | do | Do. |
| 21 | 3-amino-1,1′-diphenylsulphone-3′-sulphonic acid | bis-[4-(3′-methyl-5′-aminopyrazolyl-(1′))-phenyl]-sulphone | Do. |
| 22 | 2-amino-4′-chloro-1,1′-diphenyl-disulphimide | do | Yellow. |
| 23 | 3-amino-4′-chloro-1,1′-diphenyl-disulphimide | bis-[4-(3′-methyl-5′-aminopyrazolyl-(1′))-phenyl]-ketone | Greenish yellow. |
| 24 | 2-aminobenzene-1-sulphonic acid | do | Do. |
| 25 | 4-aminobenzene-1-sulphonic acid | do | Do. |
| 26 | 2-amino-1,1′-diphenylsulphone-3′-sulphonic acid | bis-[4-(3′-methyl-5′-aminopyrazolyl-(1′))-phenyl]-ketone | Do. |
| 27 | 2-aminobenzene-1-sulphonic acid-N-ethyl-N-(4′-sulphophenyl)-amide. | do | Yellow. |
| 28 | 2-amino-5-nitrobenzene-1-sulphonic acid | do | Orange. |
| 29 | 4-aminobenzene-1-sulphonic acid-N-ethyl-N-(4′-sulphophenyl)-amide. | bis-[3-(3′-methyl-5′-amino-pyrazolyl-(1′))-phenyl]-ketone | Yellow. |
| 30 | 2-amino-1,1′-diphenylsulphone-3′-sulphonic acid | do | Do. |
| 31 | do | bis-[3-(3′-methyl-5′-amino-pyrazolyl-(1′))-4-chlorophenyl]-ketone. | Do. |
| 32 | do | bis-[3-(3′-methyl-5′-amino-pyrazolyl-(1′))-4-methyl-phenyl]-sulphone. | Yellow. |
| 33 | 4-amino-4′-methyl-1,1′-diphenyl-disulphimide | do | Greenish yellow. |
| 34 | 4-aminobenzene-1-sulphonic acid | do | Do. |

*Table I*—Continued

| No. | Diazo component | Coupling component | Shade of wool dyeing |
|---|---|---|---|
| 35 | 2-amino-1,1'-diphenylsulphone-3'-sulphonic acid | bis-[4-(3'-methyl-5'-amino-pyrazolyl-(1'))-2-chlorophenyl]-sulphone. | Yellow. |
| 36 | 4-amino-4'-methyl-1,1'-diphenylsulphone-3'-sulphonic acid. | do | Do. |
| 37 | 3-aminobenzene-1-sulphonic acid-N-ethyl-N-(4'-sulpho-phenyl)-amide. | do | Greenish yellow. |
| 38 | 3-amino-6-methyl-1,1'-diphenylsulphone-3'-sulphonic acid | bis-[3-(3'-methyl-5'-amino-pyrazolyl-(1'))-phenyl]-sulphone. | Do. |
| 39 | 2-amino-5-nitrobenzene-1-sulphonic acid | do | Orange. |
| 40 | 2-amino-5-chloroacetylamino-benzene-1-sulphonic acid | do | Yellow. |
| 41 | 4-(4',6'-dichloro-1',3',5'-triazinylamino)-2-aminobenzene-1-sulphonic acid | do | Do. |
| 42 | 3-aminobenzene-1-sulphonic acid | do | Greenish-yellow. |
| 43 | 4-aminobenzene-1-sulphonic acid | do | Do. |
| 44 | 4-amino-diphenyl ether-3-sulphonic acid | bis-[4-(3'-methyl-5'-aminopyrazolyl-(1'))-phenyl]-sulphone. | Do. |
| 45 | 2-amino-diphenyl ether-4-sulphonic acid | do | Do. |
| 46 | 2-amino-1,1'-diphenyl sulphone-3'-sulphonic acid | do | Yellow. |
| 47 | 2-aminobenzene-1-sulphonic acid-N-ethyl-N-(4'-sulpho-phenyl)-amide | do | Do. |
| 48 | 2-aminobenzene-1-carboxylic acid | bis-[3-(3'-methyl-5'-aminopyrazolyl-(1'))-4-sulpho-phenyl]-sulphone. | Do. |
| 49 | 2-amino-4'-methyl-1-1'-diphenyl-disulphimide | do | Do. |
| 50 | 1-amino-benzene-2-5-disulphonic acid | bis-[3-(3'-methyl-5'-amino-pyrazolyl-(1'))-2-5-dibromo-phenyl]-sulphone. | Greenish yellow. |
| 51 | 2-amino-1,1'-diphenylsulphone-3'-sulphonic acid | bis-[3-(3'-methyl-5'-aminopyrazolyl-(1'))-4-chlorophenyl]-sulphone. | Yellow. |
| 52 | 2-amino-1,1'-diphenylsulphone-3'-sulphonic acid | bis-[3-(3'-methyl-5'-aminopyrazolyl-(1'))-4-bromophenyl]-sulphone. | Do. |
| 53 | 2-amino-4'-chloro-1-1'-diphenylsulphone-3'-sulphonic acid | bis-[3-3'-methyl-5'-amino-pyrazolyl-(1))-phenyl]-sulphone | Do. |
| 54 | 2-amino-4'-methyl-1-1-diphenylsulphone-3-sulphonic acid | do | Do. |
| 55 | do | bis-[3-(3'-methyl-5'-amino-pyrazolyl-(1'))-4-methyl-phenyl]-sulphone. | Do. |
| 56 | 2-amino-benzene-1-sulphonic acid-N-ethyl-N-4'-sulpho-phenylamide. | do | Do. |
| 57 | do | bis-[3-(3'-methyl-5'-amino-pyrazolyl-(1'))-4'-ethylphenyl]-sulphone. | Do. |
| 58 | 4-amino-1,1'-diphenylether-3'-sulphonic acid | do | Greenish yellow. |
| 59 | do | bis-[2-(3'-methyl-5'-amino-pyrazolyl-(1'))-4-carboxy-phenyl]-sulphone. | Do. |
| 60 | 2-aminobenzene-1-sulphonic acid-4'-amylphenyl ester | bis-[2-(3'-methyl-5'-amino-pyrazolyl-(1'))-4-sulphophenyl]-sulphone. | Yellow. |
| 61 | 3-amino-1,1'-diphenylketone | bis-[3-(3'-methyl-5'-amino-pyrazolyl-(1'))-4-sulpho-phenyl]-disulphimide. | Greenish yellow. |
| 62 | do | bis-[3-(3'-methyl-5'-aminopyrazolyl-(1'))-4-sulphophenyl]-sulphone. | Do. |

What is claimed is:

1. A disazo dyestuff of the formula

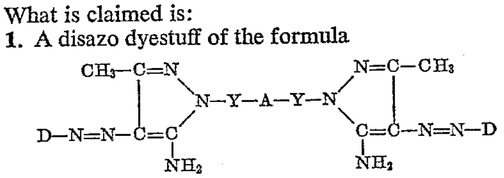

wherein each D is a member selected from the group consisting of carboxyphenyl, sulfophenyl, phenoxyphenyl, phenylsulfonylphenyl, phenoxysulfonylphenyl, N-phenyl-N-lower alkylsulfamyl-phenyl, N-phenylsulfonyl-sulfamyl-phenyl, and benzoylphenyl, both D's together containing from 0 to maximally 4 water-solubilizing groups selected from the class consisting of —COOH and $—SO_3H$, the phenyl ring in D which is attached to the adjacent azo bridge, being further substituted by a member selected from the group consisting of hydrogen, nitro, chloro, chloroacetylamino, 4,6 - dichloro-s-triazinyl-(2)-amino, and lower alkyl, each Y is a phenyl ene radical with from one to two substituents selected from the group consisting of hydrogen, chloro, bromo, methyl ethyl, $—SO_3H$ and —COOH, and A is a member selected from the group consisting of —CO— and $—SO_2—$, the total number of said water-solubilizing groups being at least 1 and maximally 4.

2. A disazo dyestuff of the formula

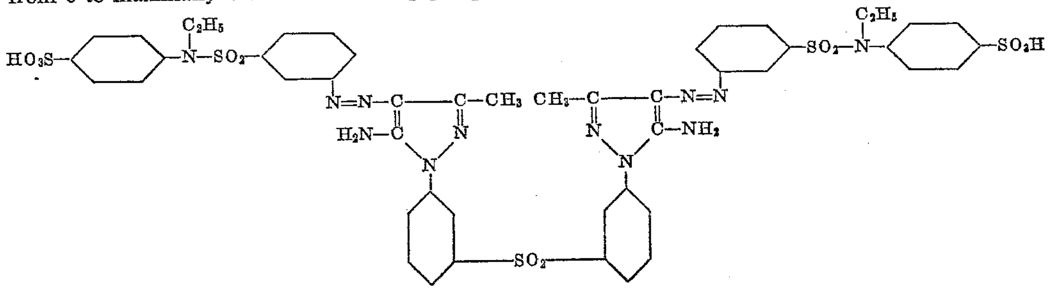

3. A disazo dyestuff of the formula

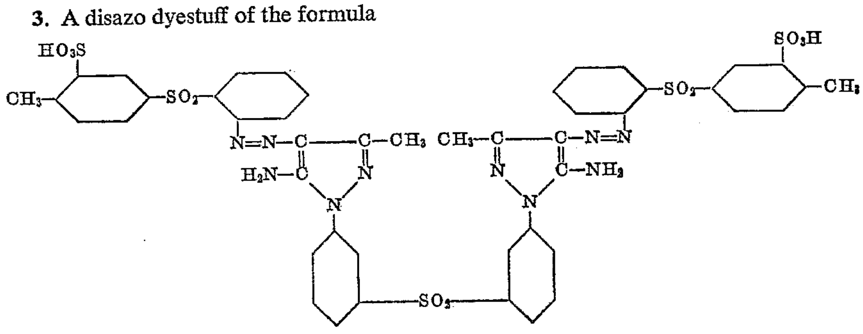

4. A disazo dyestuff of the formula
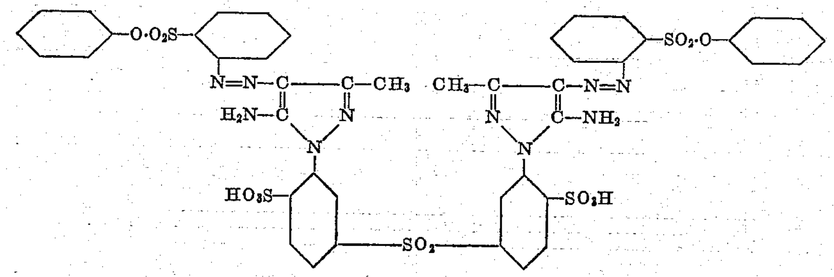
References Cited by the Examiner
FOREIGN PATENTS
885,851 6/43 France.
791,443 3/58 Great Britain.
232,046 8/44 Switzerland.
232,047 8/44 Switzerland.
232,048 7/44 Switzerland.
CHARLES B. PARKER, *Primary Examiner.*